United States Patent [19]

Walser

[11] 4,233,046
[45] Nov. 11, 1980

[54] METHOD OF MAKING GLASS FIBERS HAVING A REDUCED TENDENCY TO GIVE GUMMING DEPOSITS

[75] Inventor: Douglas M. Walser, Lexington, N.C.

[73] Assignee: PPG Industries, Inc., Pittsburgh, Pa.

[21] Appl. No.: 51,087

[22] Filed: Jun. 22, 1979

Related U.S. Application Data

[62] Division of Ser. No. 946,996, Sep. 29, 1978.

[51] Int. Cl.³ .............................................. C03C 25/02
[52] U.S. Cl. .................................... 65/3 C; 106/211; 106/212; 106/213; 428/378
[58] Field of Search ............... 65/3 C; 106/211, 212, 106/213, 216; 428/268, 378, 423, 391, 392, 429

[56] References Cited

U.S. PATENT DOCUMENTS

| 3,227,192 | 1/1966 | Griffiths | 65/3 C X |
|---|---|---|---|
| 3,615,311 | 10/1971 | Ignatius | 65/3 C |
| 3,664,855 | 5/1972 | Morrison et al. | 65/3 C X |
| 3,869,308 | 3/1975 | Graham | 65/3 C X |
| 3,928,666 | 12/1975 | Morrison et al. | 65/3 C X |
| 4,066,106 | 1/1978 | Graham | 428/268 X |
| 4,147,833 | 4/1979 | Eilerman et al. | 65/3 C |

*Primary Examiner*—Robert L. Lindsay, Jr.
*Attorney, Agent, or Firm*—Kenneth J. Stachel

[57] ABSTRACT

A method and composition are provided for producing an improved sized glass fiber strand that has a reduced tendency to form gummy deposits on fabrication machinery under high relative humidity conditions. The glass fiber strand is treated with a starch based forming size comprising about 50 to about 65 weight percent of the non-aqueous components of the composition being a starch containing cross-links that has been partially cooked along with a hydrogenated vegetable oil, or fatty triglyceride, cationic wetting agent, emulsifying agent, and water. The forming size composition can also contain a salt of a polyamino functional polyamide resin and a carboxylic acid and a wax and a coupling agent.

7 Claims, No Drawings

METHOD OF MAKING GLASS FIBERS HAVING A REDUCED TENDENCY TO GIVE GUMMING DEPOSITS

This is a division of application Ser. No. 946,996, filed Sept. 29, 1978.

BACKGROUND OF THE INVENTION

The invention is directed to a forming size, method for producing glass fiber strands and the improved glass fiber strands that have a reduced tendency to form gumming deposits when the glass fiber strands are used under high relative humidity conditions.

Glass fiber strands are made from a multitude of fine glass fibers which are formed by being drawn at a high rate of speed from molten glass streams flowing from small openings in a bushing. Since glass fibers easily abrade each other, a chemical size is applied to the fibers to protect the fibers when they are gathered together into a strand and when the strand is further processed. Chemical sizes typically contain a lubricant for the fibers to prevent abrasion of the individual fibers against each other or against glass fiber handling equipment. The chemical size gives the fibers integrity and workability for any standard textile or reinforcement use. If a strand does not have proper integrity, fuzzing occurs during processing operations and eventually the strand will break. After the glass fibers are formed and coated with the chemical size, they are drawn together by a gathering shoe into one or more glass fiber strands. The drawing of the fibers from the bushing is effected by the use of a winder which is also used to wrap the strand on a tube or spool to produce a forming package. The strand on the forming package is placed in an oven to dry or is allowed to air dry to reduce the moisture content of the strand to facilitate removal of the strand from the forming package. The glass fiber strand can be removed from the forming package to produce yarn, twisted strand, according to conventional textile twisting techniques such as winding strands on a twist frame and collecting them on a bobbin.

The glass strand, yarn or twisted strand so produced can be used in many reinforcement applications. In industrial applications they are combined with other glass fibers and woven into tapes and fabrics. Also, they are used in making non-woven crims for reinforcement of paper, film and foil laminate. They are also used for reinforcing laminates of paper, foil and various combinations of these materials. They are used widely for reinforcement of carton sealing tape and box corner tape. Also, woven fiber glass fabrics and tapes have hundreds of uses. Among the most common are electrical insulation; reinforcement for laminating or electronic panel boards and print circuits; reinforcement of plastics for boats and for automotive and aircraft parts; filtration fabrics for use in the foundry, carbon black and cement industries; control of air pollution; and use in tarpoulins, roofing membranes and air supported structures.

In processing glass fiber strands and producing many of the above mentioned products the strands must pass through machinery guide bars and other orientation devices, for example, in the production of glass fiber reinforced tape, the glass fiber strands are oriented by a meir bar for proper alignment before coming in contact with the tape material. Manufacturers of glass fiber reinforced tape material have encountered difficulty in producing the glass fiber reinforced tape under high relative humidity conditions. Under these conditions the current binders, used on glass fibers to protect them from breaking when the glass fiber strands are handled and manipulated through machinery, has a tendency to leave gummy deposits on guide bars or orientation devices like the meir bar.

The current binders that are used on glass fibers contain carbonaceous lubricants like an aqueous size including a hydrolyzed starch such as dextrinized corn starch with a vegetable oil. The amount of forming size deposited on the glass fiber is usually about 0.7 to about 2 percent byweight based on the weight of the glass. In addition such additives as cationic wetting agents, emulsifying agents, film-formers such as gelatin and polyvinyl alcohol, may be added to the partially or fully dextrinized starch and hydrogenated vegetable oil. Also, since there is usually a long drying period during which the wet starch and oil deposit can act as a base upon which a fungus can grow, a small amount of fungicide is added, possibly along with a disinfectant.

The proportions of starch, oil, and other additives and the types of starch, oil, and other additives in binders have been varied to suit various requirements. For example, in U.S. Pat. No. 3,227,192 (Griffiths) a sized glass fabric and method are disclosed wherein the aqueous size contains as the binder ingredient an amylose containing starch mixture, having an amylose content of about 35 to 45 percent by weight based on total starch content. The mixture is formed by mixing approximately equal portions of a high amylose starch fraction wherein the remainder of starch is amylopectin and of a water repellent low amylose starch fraction wherein the greater portion of the remainder is amylopectin. Also in U.S. Pat. No. 3,615,311 (Ignatius) a starch size composition is disclosed for coating glass fibers, which has greatly improved drying properties. The starch size composition includes a relatively narrow range of a non-crosslinked cationic starch, which is made cationic by attaching a nitrogen or phosphorous having an unshared pair of electrons thereon to a natural starch molecule, and an underivatized starch that is preferably high in amylose where a portion of the granules of which are incompletely burst. Also, in U.S. Pat. No. 3,869,308 (Graham) a method of producing an improved sized glass fiber strand suitable for plastisol coating is disclosed. The starch based forming size used to coat the glass fiber strand contains a starch, the salt of a polyamino-functional polyamide resin and a carboxylic acid, a wax and fatty triglyceride.

It is the object of the present invention to provide glass fiber strand that has a reduced tendency to form gummy deposits on fabricating equipment, mostly on those parts of the equipment which contact the sized fiber strands under high relative humidity conditions by the use of a fiber size composition that is more hydrophobic than conventional fiber size compositions.

SUMMARY OF THE INVENTION

According to the present invention it has been discovered that an improved fiber size composition is produced when a relatively narrow range of an increased amount of crosslinked starch that has been only partially cooked or gelatinized is used as the starch component of the fiber size composition.

The improved binder size composition of the present invention comprises about 50 to about 65 weight percent of the size composition based on non-aqueous components of a crosslinked starch which has been only partially cooked or gelatinized. The size composition also contains other ingredients such as a vegetable oil, as a lubricant; a fungicide of the metallo organic quaternary type, e.g. tributyltin oxide ammonium complex; coupling agents; softening agents; wetting agents and additional lubricants. Small amounts of additional film-forming ingredients other than the previously mentioned starch can also be included, such as for example, gelatin, polyvinyl alcohol etc. to make a more durable strand. The method of producing the improved sized glass fiber strand of the present invention includes using a size composition that contains a crosslinked starch that has been only partially cooked or gelatinized and that has been added to the other ingredients to form the fiber size composition wherein the amount of cross-linked starch is in the range of about 50 to about 65 weight percent based on the non-aqueous components of the size composition. The glass fiber strands that are produced containing the fiber size composition with an increased amount of a cross-linked, partially cooked or gelatinized starch have a reduced tendency to form gummy deposits on fabrication machinery, when the strands are used in fabrication machinery at high relative humidity conditions.

DETAILED DESCRIPTION OF THE INVENTION

It is believed but the invention is not limited by this belief that the composition and method of the invention gives improved sized glass fiber strands and yarn because of the use of the particular amount and kind of the starch. The amount of starch used is about 50 to about 65 weight percent based on non-aqueous components of the size composition. The kind of starch used is a cross-linked, partially cooked starch. The kind and amount of starch used in the size formulation increases the hydrophobic character of the sized glass fiber strands and therefore under high relative humidity conditions makes the glass fiber strands less susceptible to forming gummy deposits because a high moisture content is absorbed by the starch on the sized glass fiber strand.

The starch constitutent of the size of the present invention is incorporated to bind the glass fibers together into a strand in order that the strand will have enough integrity to withstand the winding and twisting operation encountered in processing the strand, and to reduce the tendency of fiber glass strand containing a starch binder to leave gummy deposits on fabrication machinery under high relative humidity fabrication conditions. The starch constitutent can be any starch from the commercially available starches such as those derived from corn, potato, wheat, sago, tapioca and arrow root which has been modified by cross-linking. The cross-linking modification may be carried out by any conventional method known to those skilled in the art. The starch can contain any percentage of amylose starch and any percentage of amylopectin starch that are known to be used in the art. The starch may be a low amylose starch, which is a water repellant starch that contains from 25 to 27 percent amylose with the remainder being amylopectin starch. The low amylose starch contains cross-links and is preferably a lightly cross-linked corn starch. Also considered to be included for the purpose of this invention are starch mixtures containing a low amylose component and a high amylose component that are lightly cross-bonded to each other to provide a weak knit. The preferred starch is amylomaize which is a hybrid cornstarch having an amylose content of 55 percent by weight, for example Amaizo 213.

The cross-linked starch is partially cooked or gelatinized by mixing the starch with water in a main tank with good agitation and heating the mixture while agitation is continued and then cooling the mixture by addition of water. In the present invention it should be noted that the term cooking is intended to note particle breakdown with attendant conversion of the material to the form of a solution. It is preferred to partially cook the cross-linked starch by adding the starch to water and heating the mixture in a jet cooker at a temperature in the range of about 220° F. (104° C.) to about 250° F. (121° C.) at a pressure in the range of about 90 psi to about 110 psi. Any temperature and pressure equivalent to these temperatures and pressures can be used. The amount of cross-linked, partially cooked starch present in the size composition is in the range of about 50 to about 65 weight percent based on the non-aqueous components of the composition. This amount is effected by adding the other ingredients of the fiber size composition to the vessel containing the partially cooked cross-linked starch.

The preferred fiber size composition of the present invention contains the cross-linked, partially cooked starch in amounts of about 50 to about 65 weight percent of the non-aqueous components along with a salt of the polyamino-functional polyamide resin and carboxylic acid, a wax and a fatty triglyceride as used in U.S. Pat. No. 3,869,308 (Graham) hereby incorporated by reference.

The salt of the polyamino-functional polyamide resin and carboxylic acid is formed by the addition of said carboxylic acid to said polyamino-functional polyamide resin. The polyamino-functional polyamide resin can be any such resin but preferably is one which has an amine value between 100 and 400. These resins are formed normally by the condensation reaction of a polycarboxylic acid such as a dimerized or trimerized fatty acid and a polyamine such as tetraethylene pentamine, ethylene triamine, diethylene triamine, diethylenetetramine and the like. A carboxlic acid constituent of the aforementioned salt is chosen from a group of organic carboxylic acids having 1 to 5 carbon atoms, such as formic acid, acetic acid, acrylic acid, methacrylic acid, butyric acid, chloracetic acid, pentanoic acid or the like.

The wax component of the size composition of this invention can be any suitable wax selected from the group consisting of a vegetable wax such as carnauba, Japan, bayberry, caldelillia and the like. Animal waxes such as bees wax, chinese wax, hydrogenated sperm oil wax and the like; mineral waxes, synthetic waxes and the like.

The fatty triglyceride component of the fiber size composition, which is the vegetable oil component of the size, is preferably a hydrogenated fatty triglyceride such as hydrogenated corn oil, glycerol tristearate, hydrogenated glycerol trioleate, soybean oil and the like.

It is also preferred that the fiber size composition contain a coupling agent such as a silane and siloxane materials. Also coupling agents such as basic (hydroxy containing) metal salts of a strong mineral acid, such as, for example, a basic chromium chloride or basic chlorium sulfate, etc. Another type of coupling agent which can be used in the practice of this invention is a complex compound of the Werner type in which a trivalent nuclear atom, such as chromium, is coordinated with an organic acid such as methacrylic acid, i.e., a methacrylic acid complex of chromium chloride. Such agents are described in U.S. Pat. No. 2,611,718.

In addition, if desired, other known fiber glass lubricants can be added to the primary components of the fiber size composition of this invention such as alkyl imidazoline derivatives which include compounds of the class n-alkyl N-amidoalkylimidazolines which may be formed by causing fatty acid to react with polyalkylene polyamines under conditions which produce ring closure. The reaction of tetraethylene pentamine with stearic acid is exemplary of such a reaction. The imidazolines are described more fully in U.S. Pat. No. 2,200,815. Other suitable imidazolines are described in U.S. Pat. Nos. 2,267,965; 2,268,273 and 2,355,837. These alkyl imidazolines derivatives may be used in combination with or replaced by quaternary pyridinium compound as described in U.S. Pat. No. 3,869,308 which has been incorporated herein by reference.

The size composition utilized in accordance with the instant invention may also include a wetting agent. The wetting agent is preferably cationic or non-ionic and it may also serve as an additional lubricant. Any material can be used which is conventionally known to be useful as such and which will reduce the surface tension of the aqueous size so that it is about 25 to 35 dynes per square centimeter.

The total solid (non-aqueous) content of the aqueous size of the preferred embodiment of the invention is about 2 to about 20 percent by weight and preferably 3 to 10 percent by weight. In all events the total solids should be adjusted to a level whereby the viscosity of the size solution is acceptable for application to the glass filaments i.e., 10 to 50 centipoise at 60° C.

The fiber sizing composition of the present invention is preferably applied to the glass fibers from an applicator during their formation. The fibers are gathered into strand by means of a gathering shoe and then wound on a rotating drum-type winder onto a forming tube. The collet on which the forming package rides is rotated about 4,420 revolutions per minute and the spiral directing the strand onto the forming package is generally operated around 2,300 revolutions per minute. The applicator is generally a rotating belt-type applicator generally rotating at a 133 revolutions per minute. After the winding of the forming package is completed, a package is placed in an oven for drying. Other conventional methods of applying a fiber size to glass fibers may be used in applying the fiber size composition of the present invention to glass fibers.

To further illustrate the composition and method of the present invention reference should be made to the following examples:

EXAMPLE I

A fiber sizing composition having the following ingredients was prepared:

| Ingredient | Amount in Grams Per 10 Gallons |
|---|---|
| Amaizo 213 Hybrid cornstarch having a amylose content 55 percent by weight. | 1600.00 |
| Paraffin Wax | 327.00 |
| Soybean Oil | 327.00 |
| Tween 81 ® Ethylene Oxide derivative of a sorbitol ester | 30.00 |
| Cation-X ® (Alkyl imidazoline reaction product of tetraethylene pentamine and stearic acid). | 218.00 |
| Igepal ® CA 630 (octyl phenoxy poly-(ethyleneoxy) ethanol-wetting agent) | 5cc |
| Biomet 66 (Biocide-BIS) tri-n-butyl tin oxide and n-alkyl 12 C 18 (dimethyl benzyl ammonium chloride) | .68cc |
| Gamma methacryloxy propyltrimethoxy silane | 50.00 |
| Acetic acid | 2.5cc |
| Versamid 140 (General Mills: polyamino functional polyamid resin, amine value 370–400) | 200.00 |
| Acetic Acid | 50cc |
| Water | Sufficient to make 10 gallon of size solids |

Percent solids 6.7 ± 0.3 and ph of 6.0 ± 0.3. The weight percent of the cross-link starch was 56.9% in the formulation of EXAMPLE I.

The aqueous size was prepared as follows:

The starch was heated to 225° F. plus or minus 2° F. and cooled to below 190° F. which was a partial cooking of the starch. It is preferred to partially cook the starch to within about 50 percent of complete cooking. The starch cooled to 190° F. was mixed with an oil and water emulsion of the paraffin wax, the hydrogenated soybean oil, and the polyoxyethylene (5) sorbitan monooleate; such emulsion formed by agitating the ingredients with an Epenbach agitator while adding enough water to emulsify. Cation-X after being dissolved in sufficient water to form a homogeneous dispersion, is added to the above starch containing emulsion. The Biomet 66 and the octylphenoxy (ethyleneoxy) ethanolmixture were dispersed in water and added to the emulsion. The gamma-methacryloxy-propyltrimethoxy silane is added to the mixture after hydrolysis with 2.5 acetic acid in water solution. The Versamide 140 is reacted with the 52 grams of acetic acid and water solution to form a salt; the sizing solution is completed by the addition of the salt solution and dilution to a total volume of 10 gallons. During the entire procedure for combining the above ingredient, agitation is employed to effect a homogeneous mixture.

EXAMPLE II

A fiber sizing composition having the following ingredients was prepared:

| Ingredient | Amount Lbs. Per 1000 Gallons |
|---|---|
| Amaizo 213 Hybrid Cornstarch | 352.4 lb. |
| Paraffin | 72.1 lb. |
| Soybean Oil | 72.1 lb. |
| Tween 81 ® ester derivative | 6.6 lb. (96 M.S.) |
| Cation-x-200 reaction product | 48.0 lb. |
| Igepal ® CA-630 wetting agent | 500 ml |
| Biomet 66 biocide | 68 ml |
| Gamma methacryloxy propyltrimethoxy silane | 11 lb. |
| Acetic Acid | 250 ml |
| Versamid 140 resin | 44.1 lb. |
| Acetic Acid | 5000 ml |
| Water | 240 gal. |

The final percent solids of the composition was 6.60±0.20% and the final pH was 6.0±0.2 and the final viscosity was 30–50 cps (150° F.). The weight percent of cross-linked cornstarch in the composition was 57.5 percent.

The above composition was prepared by heating the starch in an aqueous solution to a temperature of 225° F.±2° F. in a jet cooker and then cooled to below 190° F. This constituted a partial cooking of the starch. In a separate tank the silane is mixed with acetic acid and water. Also an emulsion of wax, soybean oil and Tween 81 ® are prepared. The emulsion and silane are added to the partially cooked starch. Then an aqueous dispersion of Cation-X ® and a mixture of Versamid 140 in acetic acid and mixture of Biomet 66 in water and a mixture of Igepal ® CA-630 in aqueous solution are added to the starch mixture. The starch mixture is then diluted to give the final volume of 1000 gallons.

The size of Example II prepared as described was applied to individual glass fibers as they were drawn from orifices of an electrically heated, platinum alloy bushing containing molten glass to form fibers of 0.0003/6 inches in diameters. The size was applied to the fibers prior to the time they were grouped together to form a strand containing 200 fibers by means of a roller applicator which is partially submerged in the sizing solution contained in a reservoir. Such an applicator is shown in more detail in U.S. Pat. No. 2,728,972. The fibers were grouped into strands by a gathering shoe and wound on a forming package rotating approximately 4,420 rpm to produce a strand travel speed of approximately 14,000 feet per minute.

Other methods of applying size to the strand of glass fibers, such as a pad applicator may be employed and a strand may be formed by means other than winding on the forming tube, such as by means of a pair of rotating wheel pullers which direct the strand into a suitable collecting device.

The glass fiber strands wound on the forming package are then dried. This may be done by any number of known methods sufficient to reduce the moisture level to that appropriate for such processing (i.e., 5 to 10 percent). After the forming packages have dried, the strand is unwound onto a bobbin, the forming package and the bobbin being mounted on a twist frame. During the unwinding and rewinding step, a twist is imparted into the strand which provides integrity for subsequent processing.

When the twisted strand or yarn is to be used for textile applications, beaming is a standard process employed to prepare the yarn. This involves a plurality of bobbins being mounted on racks and the end of each bobbin being threaded through a tensioning disc and through a plurality of guide eyes over a separating comb and onto a beam which is a large cylinder. Then the plurality of yarn ends are wound on this beam in parallel fashion.

EXAMPLE III

Glass fiber strands prepared with the fiber size composition of Example II were made into a 600-end section beam. The beam was then placed in a slasher and evaluated for high humidity set ups. Approximately 2,000 yards of strand were run at the 85 to 95 percent relative humidity level with no gumming on an orientation bar such as a meir bar. Also additional yardage holding the percent relative humidity at the 75 to 85 percent range was run. Again the meir bar had a powdery build-up with no gummy deposits.

EXAMPLE IV

For comparison, testing yarn containing the fiber sizing composition of Example II and yarn containing a fiber size composition identical to that of Example II except where the starch was a cross-bonded, fine, snow-white, powdered, solid distarch phosphate in an amount of 48.8 weight percent of the size that has been fully cooked. Since the starch was less than about 50 weight percent of the size composition and since it was fully cooked and not just partially cooked, the yarn containing the size composition formed using this starch should not perform as well as the yarn with the size composition of Example II in high relative humidity conditions. Both yarns, i.e., the one with the size of Example II and the one with the comparison size were made from G-1501/0 strands.

A 660 end beam from 200 ends each of the above yarns was made. This beam was 3,000 yards long. After beaming the beam was placed in a slasher creel and threaded to simulate the Permacel evaluation. This evaluation consists of placing the beam in the back of a slasher creel and threading the ends through a comb, a three-roll assembly that simulates a tension tower, a hook reed and under a meir bar for simulating a fabrication machine. During this particular evaluation the top roll of the tension tower was placed approximately 3 feet from the two bottom rolls. The tension on the individual ends range from 110 to 165 grams with the Yarn containing the size of Example II exhibiting a slightly higher tension level. The percent relative humidity (% RH) as measured with a Bendix psychron was only 65 percent. The run speed during the evaluation was 48 yards per minute. The 1,500 yards of strand were removed during the evaluation with no problem. The binder shed was powdery for both yarns and the meir bar cleaned easily.

The beam was then moved forward and the tension tower was removed. The beam was enclosed in plastic and the beam was run under high humidity simulation. One thousand yards of the yarn were removed from the beam under the evaluation. The percent relative humidity averaged 90 percent during the run with a low of 80% RH and a high of 95 percent. There were no problems running the beam and after 1,000 yards the meir bar was removed and inspected. Although there was some binder shed from the Example II yarn, the shed was powdery and came off the meir bar easily. The comparison yarn had a large amount of broken filaments at the meir bar and the binder shed from the comparison yarn was hard and difficult to remove from the meir bar.

The foregoing has described an improved glass fiber yarn and strands containing a size composition comprised of about 50 to about 65 weight percent of a cross-linked, partially cooked or gelatinized starch based on the non-aqueous components therein. The improved glass fiber yarn and strand containing the improved size composition and the method of making the sized glass fiber strand and yarn lead to the improved functioning of the starch sized glass fiber strands under high relative humidity conditions since the strands and yarn of glass fiber strands have a reduced tendency to form gummy deposits during fabrication at high relative humidity conditions.

I claim:

1. In a method of forming a sized glass fiber strand comprising drawing glass streams through orifices in a bushing to form individual glass fibers, moving the fibers away from the bushing at a high rate of speed and forming them into a strand, and applying to the fibers while they are moving at this speed and before they are formed into a strand a starch-based sizing solution; 4 percent to 52 percent by weight of the salt of a polyamino functional polyamide resin, said polyamino functional polyamide resin salt being formed from the condensation reaction product of a carboxylic acid and a polyamine, said polyamine having greater than 2 amine groups per molecule, and a carboxylic acid having 1 to 5 carbon atoms; 5 to 25 percent by weight of a wax from the group consisting of animal waxes, vegetable waxes, mineral waxes and synthetic waxes; and 9 percent to 77 percent by weight of a fatty triglyceride; and collecting the glass strands so produced; the improvement comprising:

using in the size solution about 50 to about 65 weight percent based on the non-aqueous components in the solution of a starch containing cross-links that has been partially cooked to within about 50 percent of complete cooking so that the sized glass strands produced have a reduced tendency to form gummy deposits under high relative humidity conditions.

2. Method according to claim 1 wherein the cross-linked starch was partially cooked by heating the starch to a temperature in the range of about 220° F. to about 250° F. in a jet cooker at a pressure in the range of 90 to about 110 psi and cooling the starch to below around 190° F.

3. Method according to claim 1 wherein the fatty triglyceride is hydrogenated soybean oil.

4. Method according to claim 1 wherein the wax is paraffin.

5. Method according to claim 1 wherein the size contains 10 to 45 percent by weight of an alkyl imidazoline.

6. Method according to claim 1 wherein the carboxylic acid is acetic acid.

7. Method according to claim 1 wherein the starch is a cross-linked cornstarch having an amylose content of from 25 to 27 percent by weight of the starch.

* * * * *